United States Patent [19]
Cox et al.

[11] Patent Number: 6,010,285
[45] Date of Patent: Jan. 4, 2000

[54] COLLAPSIBLE VEHICLE TRANSPORTATION FRAME

[75] Inventors: Richard Dawson Cox, Duluth; Michael Cottrell, Gainesville, both of Ga.

[73] Assignee: Kar-Tainer International, Inc., Decatur, Ga.

[21] Appl. No.: 08/943,539

[22] Filed: Oct. 3, 1997

[51] Int. Cl.[7] .............................. E04H 6/06; B60P 7/08
[52] U.S. Cl. ................................. 410/26; 410/24
[58] Field of Search .......................... 410/4, 24, 26; 414/498; 220/1.5; 211/191, 192, 194, 195, 208

[56] References Cited

U.S. PATENT DOCUMENTS

| | | | |
|---|---|---|---|
| 4,917,557 | 4/1990 | Kato et al. . | |
| 5,056,624 | 10/1991 | Georges | 410/24 X |
| 5,106,246 | 4/1992 | Chance | 410/26 |
| 5,213,458 | 5/1993 | Preller et al. | 410/26 |
| 5,427,485 | 6/1995 | Henderson et al. | 410/26 |
| 5,547,333 | 8/1996 | Pienaar | 410/24 X |
| 5,765,701 | 6/1998 | Gearin et al. . | |
| 5,775,858 | 7/1998 | Bacon | 410/26 |
| 5,797,712 | 8/1998 | Gearin et al. | 410/26 X |

FOREIGN PATENT DOCUMENTS 2151249  4/1973  Germany ................................. 220/1.5

*Primary Examiner*—Stephen T. Gordon
*Attorney, Agent, or Firm*—Troutman Sanders LLP; Gerald R. Boss, Esq.

[57] ABSTRACT

This invention relates to a vehicle transportation frame for packing vehicles in a transport container. The frame includes a base, a front support member pivotally attached to the front portion of the base, a rear support member pivotally attached to the rear portion of the base, and a ramp pivotally attached on one end to the rear support member, and releasably attachable on the other end to the front support member. The support members pivot from a substantially upright support position to a substantially flat non-use position relative to the base.

13 Claims, 7 Drawing Sheets

COLLAPSIBLE VEHICLE TRANSPORTATION FRAME

FIELD OF THE INVENTION

This invention relates to a collapsible frame device suitable for packing vehicles in a transport container. The invention also relates to a method of packing vehicles in a transport container.

BACKGROUND OF THE INVENTION

When packing motor vehicles in transport containers such as shipping containers, at least some of the vehicles may be are provided in an inclined position relative to the container floor in order to maximum the number of vehicles that can be shipped in the container.

In order to pack two motor vehicles into a standard six meter shipping container, one vehicle is often placed in an inclined position in the container with one end of the vehicle located near the floor of the container and the other end positioned near the roof of the container while the second vehicle is positioned substantially horizontally, parallel to the container floor, partially underneath the first vehicle. The same method may also be used to pack for example, four vehicles into a standard twelve meter shipping container.

The frame devices used to pack vehicles in transport containers are usually bulky and take up an undesirably large amount of space when, for example, they are transported in a non-used state, such as on a return trip after use. Frame devices known in the art often include multiple pieces which must be separately assembled and disassembled. Frame devices can also require complex pneumatic, hydraulic, or electrical components to position elements of the frame in assembled and disassembled positions. Such components can be expensive and are often subject to undue wear and failure during use.

OBJECTS AND SUMMARY OF THE INVENTION

It is an object of the present invention to provide a frame device suitable for packing vehicles in a transport container, the frame device being collapsible allowing it to take up relatively little space when transported in a non-used state. It is a further object of the present invention to provide a frame device that can be erected and collapsed with relatively little effort.

It is a further object of the invention to provide a collapsible frame device which does not require numerous separate components, nor pneumatic, hydraulic, or electrical components for assembly or disassembly.

The present invention is directed to a collapsible frame device for packing at least two vehicles in a transport container having at least a floor and a wall 10 structure, the frame device including: a base which, in use, is constructed to rest on a container floor, the base supporting the first vehicle, the base having a front portion and a rear portion; a front support member pivotably attached to the front portion of the base, the front support member having an in-use position wherein the front support member extends substantially upward from the base, and having a non-use position wherein the front support member pivots from the in-use position to a substantially flat position relative to the base; a rear support member pivotably attached to the rear portion of the base, the rear support member having an in-use position wherein the rear support member extends substantially upward from the base and having a non-use position wherein the rear support member pivots from the in-use position to a substantially flat position relative to the base; a ramp having first and second ends, the first end pivotally attached to the rear support member, and the second end adapted to releasably attach to the front support member; wherein the second vehicle may be supported on the ramp.

The front and rear support members may support the ramp such that the ramp supports the second vehicle thereon in an inclined raised position in the in-use configuration of the device. The vehicles will normally comprise a wheeled vehicle, however, in this specification the term "vehicle" may in addition to its normal meaning also include a vehicle in semi knock-down form or a partly assembled vehicle. Mounting brackets may be provided to mount a vehicle in semi-knock down form or in a partly assembled form to the lower and upper vehicle support members.

The base may comprise a generally rectangularly shaped configuration defining two opposing long sides and two opposing short ends. The base may be in the form of a frame. The base may also be provided with a number of wheels or rollers or the like whereupon the base in use is more easily moved. Additionally, the base may incorporate channels or the like suitable to receive, for example, parts of a fork lift such that a fork lift may be used to move the device. The device may be moved and maneuvered when loaded with vehicles and also when in a collapsed or non-use configuration.

The front and rear support members may each comprise a cross-bar which extends transversely across the base from one side to the other side; and two substantially upright members which, in the erected configuration of the device, extend upright from the base on opposite sides thereof to engage the cross-bar towards opposite ends thereof thereby supporting the cross-bar in an elevated position from the base. The cross-bars may be permanently secured to the upright members.

An upright member from the rear support member and an upright member from the front support member located on one side of the base may be connected to each other via a connecting member extending transversely between the upright members. The upright members may be connected to the base via pivoting connections with the base.

In an alternative embodiment of the invention, an upright member from the rear support member and an upright member from the front support member located on one side of the base may be separate from each other. The distance between them may be adjustable.

The front and rear vehicle support members may be collapsible onto the base by pivoting them about an axis approximately parallel to the cross-bar. For example, the upright members of the front and rear support members may be hingedly attached to the base, by, for example, pin joints having pins arranged substantially transverse to the length of the base (i.e. pins substantially parallel to the short side of the base).

The ramp may comprise a pair of ramp members, each ramp member comprising an elongate member which, in the erected configuration of the device, is releasably attachable to the front support member and is pivotably attached to the rear support member. The ramp members may be adapted in use to allow a vehicle to be driven thereon in the erected configuration of the device.

In an alternative embodiment of the present invention, the rear support member may be separated into independently pivotable right and left rear support members. The right and left rear support members each supporting one of the pair of ramp members and each of the rear support members being independently pivotable about an axis substantially parallel to the short side of the base (e.g. substantially parallel to a cross-bar).

The frame device may also include a second vehicle support means for supporting a second vehicle on the base in the space provided at least partly below the ramp in the erected configuration of the device. The second vehicle support means may comprise a pair of tracks secured or securable to the base. The second vehicle support means in use preferably supports the second vehicle in a position generally parallel to the base.

The invention also relates to the use of a frame device as described herein for packing vehicles in a transport container.

According to another aspect of the present invention, a method of packing vehicles in a transport container comprises the steps of:
providing a frame device as described herein in an erected configuration at least partly outside a transport container;
providing two vehicles on the frame device, the first vehicle supported on the ramp and the second vehicle supported on the base at least partly beneath the first vehicle; and
moving the frame device with the vehicles thereon into the container.

The invention provides a vehicle transportation frame that may be easily assembled. For example, according to the present invention, while the vehicle transportation frame has a number of movable and interconnecting parts, the parts are substantially linked together such that the assembly procedure is not complicated and there are few parts that can be misplaced or lost.

The invention also provides a vehicle transportation frame that, while maintaining the convenience of having few separate and complicated parts, is also adjustable to accommodate vehicles of different sizes.

The vehicle transportation frames of the present invention are conveniently collapsible into a non-use configuration that is space conservative and that, for example, suitably stacks with multiple vehicle transportation frames in their non-use state. The support components of the device of the invention, when collapsed and folded into the non-use configuration, remain integrally attached to the device. For example, the structural members of the device may detach and/or rotate relative to other components, but are not completely removable from the device. Thus, according to the present invention, the device is designed to stack efficiently and conveniently with other collapsed vehicle transportation frames, and to assembly quickly and conveniently into the in-use configuration. The device is also designed with structural integrity sufficient to permit movement of the device with, for example, a fork lift, even when the device is loaded with vehicles.

BRIEF DESCRIPTION OF THE DRAWINGS

Without thereby limiting the scope of the invention and by means of example only, embodiments of the invention will now be described with reference to the accompanying drawings wherein.

DETAILED DESCRIPTION OF THE PREFERRED EMBODIMENTS

Figure 1:
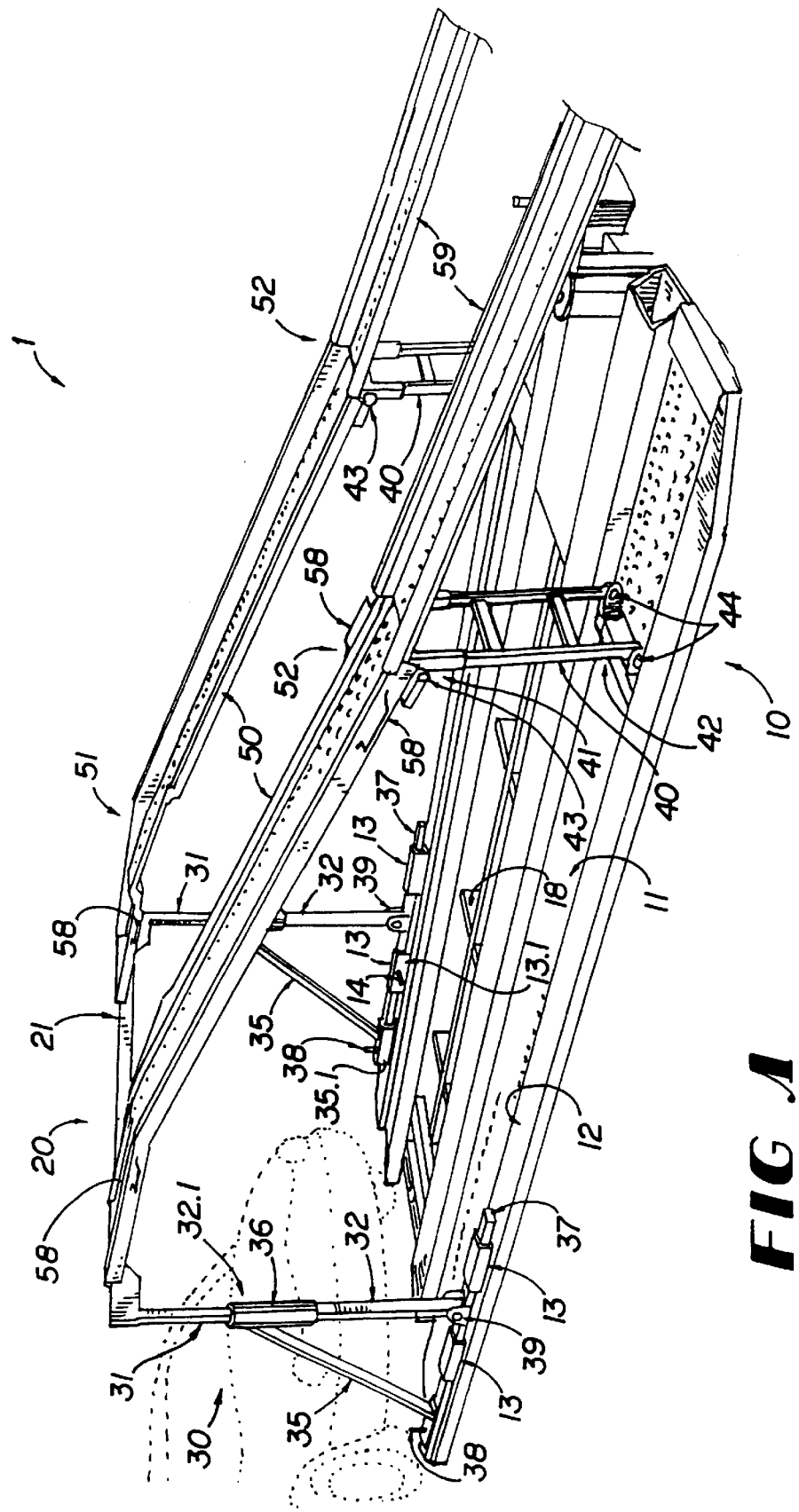
FIG. 1 is a perspective view of a frame device according to the invention.
Figure 2:
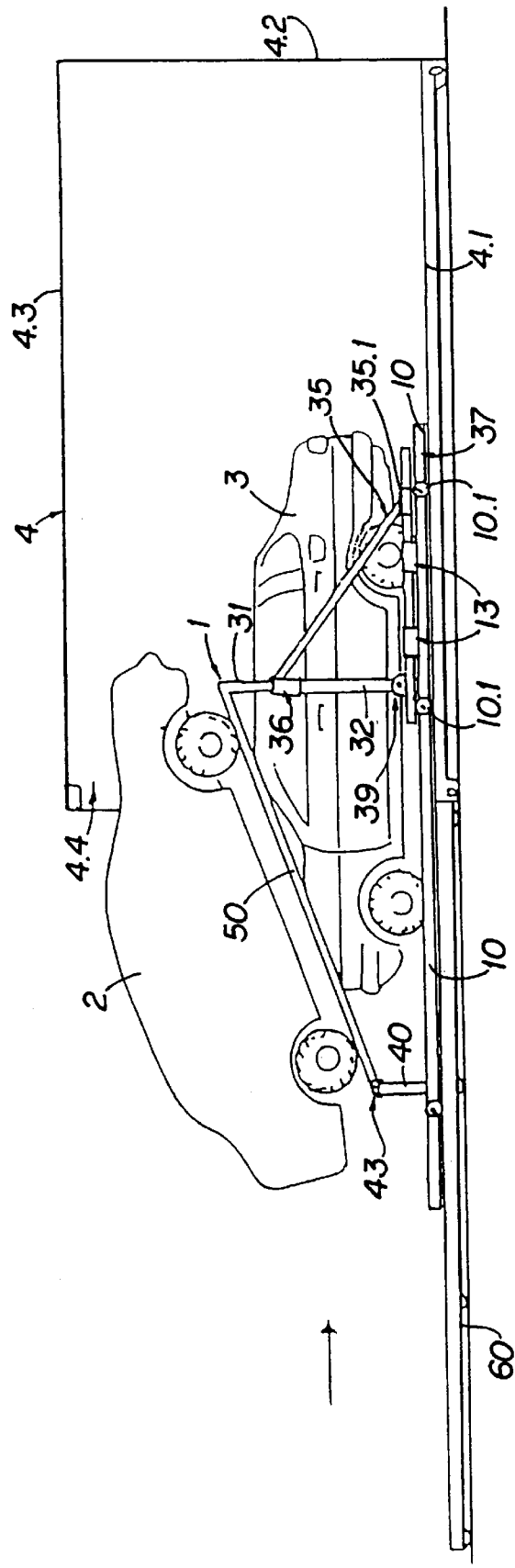
FIG. 2 is a side view of the frame device of FIG. 1 in an environment of use showing two vehicles loaded thereon and a shipping container.

FIG. 1 shows the device I according to the present invention in its assembled or in-use configuration. The device 1 is suitable for packing vehicles 2 and 3 into a transport container 4. The device 1 is shown in FIG. 2, by way of example, partially inserted into the shipping container 4. The container 4 comprises a floor 4.1, a wall 4.2, a roof 4.3 and an opening 4.4 which is closeable by means of a door or the like (not shown). The vehicles 2 and 3 may be supported on the device 1 with vehicle 2 partially raised and inclined relative to vehicle 3 in order to provide an efficient packing arrangement, as shown in FIG. 2

The device 1 includes a base member 10 which has two tracks 11 adapted to receive vehicle 3 thereon. The base member 10 preferably is rectangular in shape and may be adapted to fit into a standard six meter shipping container 4.

Attached to the base member 10 is a front support assembly indicated generally by reference numeral 20. The front support assembly 20 is attached to the front portion of the base member 10 on the outside edges 12 of the base member 10. The front support assembly 20 includes a cross-bar 21 supported on each end by leg assemblies 30. The cross-bar 21 provides support for the front end 51 of ramps 50.

Figure 4:
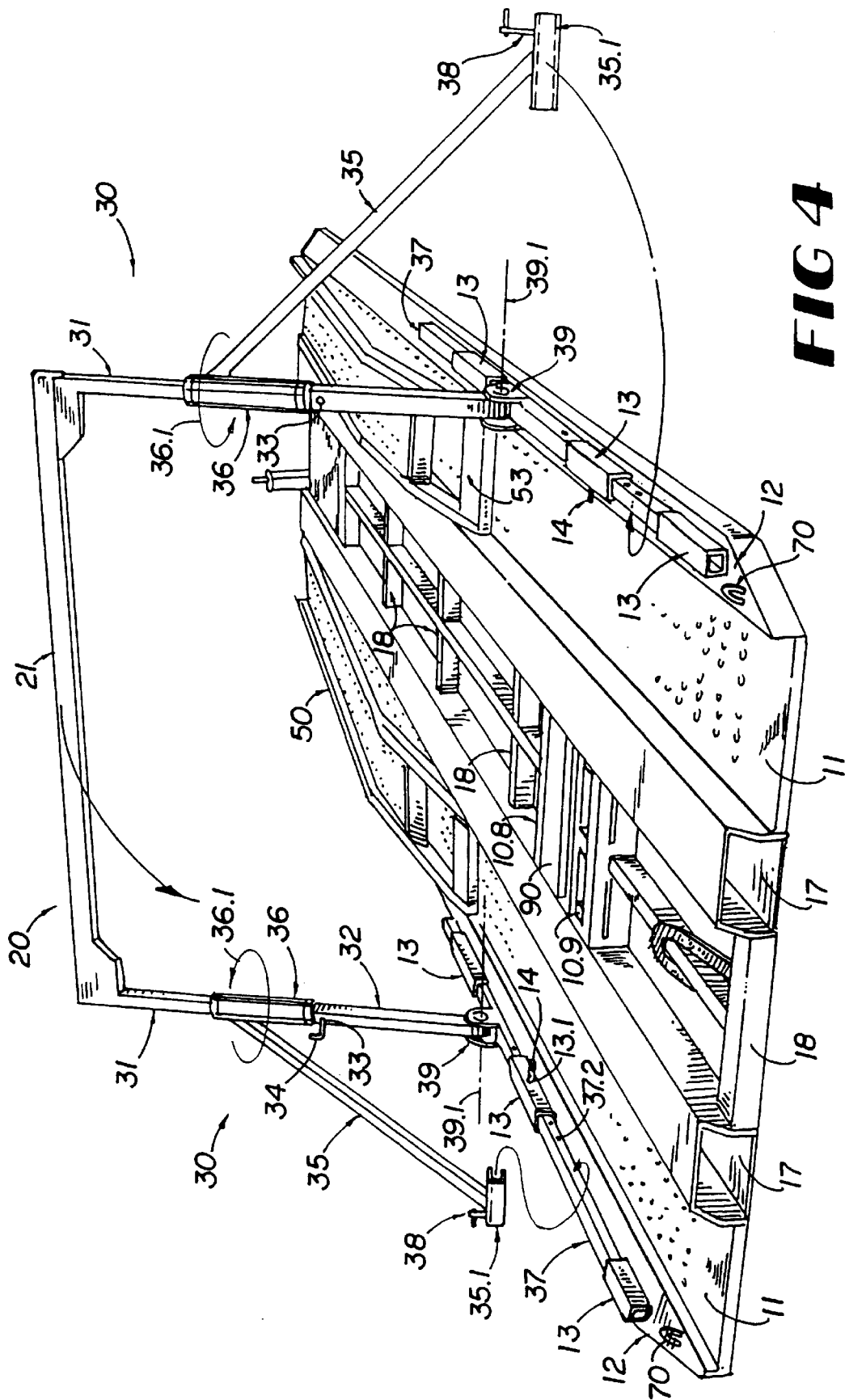
FIG. 4 is a perspective view of the device of FIG. 1 in a partially assembled configuration.
Figure 5:
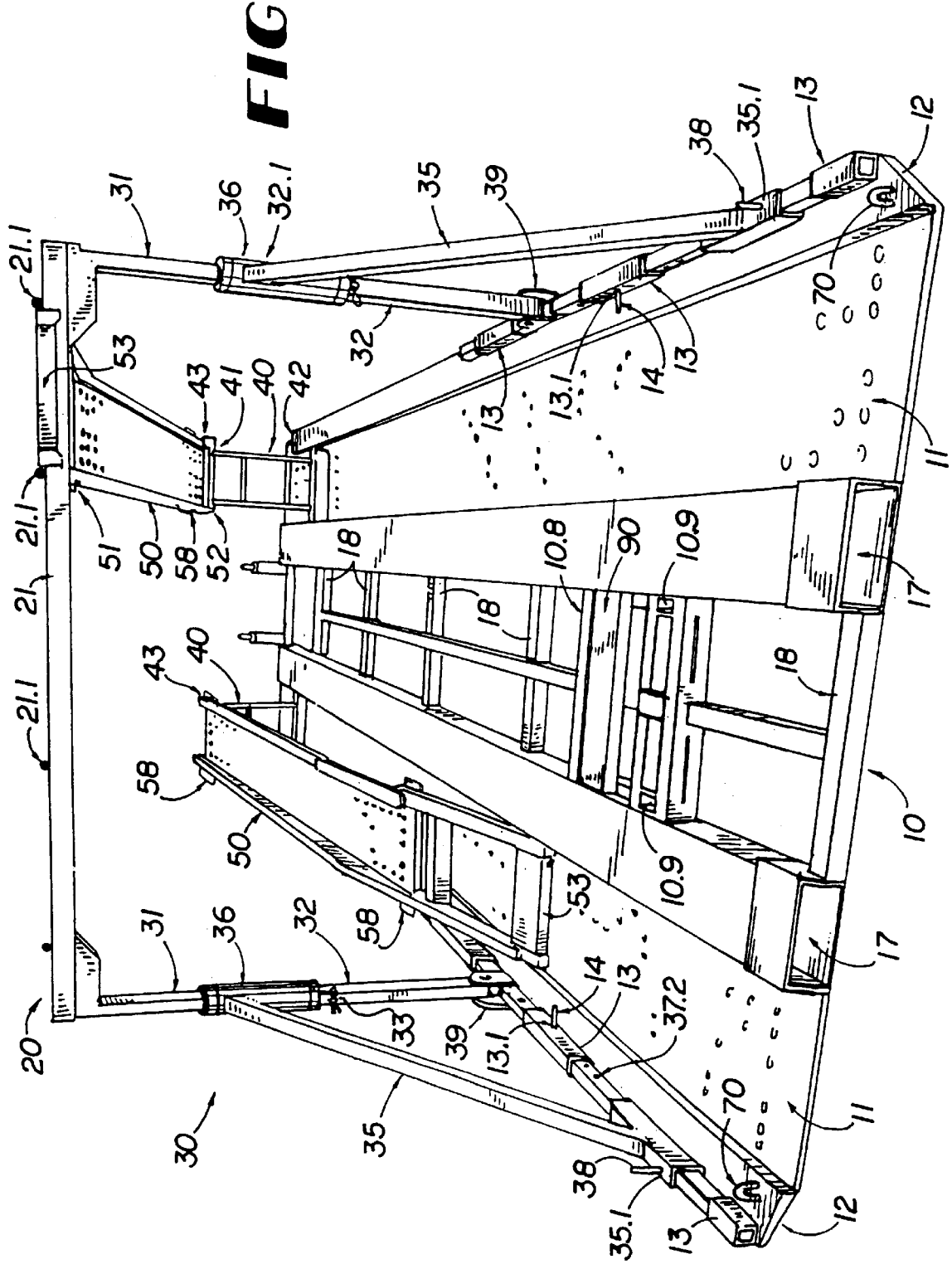
FIG. 5 is a perspective view of the device of FIG. 1 in a partially assembled configuration.

As shown in FIG. 4, the ramps 50 may be releasably connected to the cross-bar 21, for example, by channel members 53 shaped to engage the cross-bar 21 and preferably hook over the cross-bar 21. Alternatively, the ramps 50 may be connected to the cross-bar 21 by, for example, a pin connection. The cross-bar 21 may have guide members 21.1 attached thereto at spaced locations, for example, adapted to the width of a ramp 50, as shown in FIG. 5. The guide members 21.1 provide lateral stops for the ramps 50, serving to, for example, prevent lateral sliding of the ramps 50 during transport or loading of the vehicles.

The ramps 50 are supported at their back end 52 by rear support members 40. The rear support members 40 are attached at their top end 41 to the ramps 50 by pivoting joints 43 and at their bottom end 42 to the base member 10 by pivoting joints 44. Pivoting joints 43, 44 preferably are pin or rotating bolt joints.

When the device 1 is in its assembled or in-use configuration as shown in FIG. 1, the ramps 50 are adapted to receive a vehicle 2 to be supported in an inclined raised position relative to the base member 10. The ramps 50 may be equipped with one or more handles 58 located, for example, near the front end 51 and near the back end 52 of the ramps 50 to provide for convenient and easy assembly of the device 1.

As shown in FIG. 1, auxiliary ramps 59 may be removably attached to the back end 52 of the ramps 50. The auxiliary ramps 59 allow for the loading of vehicle 2 onto ramps 50 by effectively extending ramps 50 to ground level.

The auxiliary ramps 59 preferably are meant for temporary use with the ramps 50. After the vehicle 2 has been loaded onto ramps 50, the auxiliary ramps 59 preferably are removed and appropriately stored.

Figure 3:
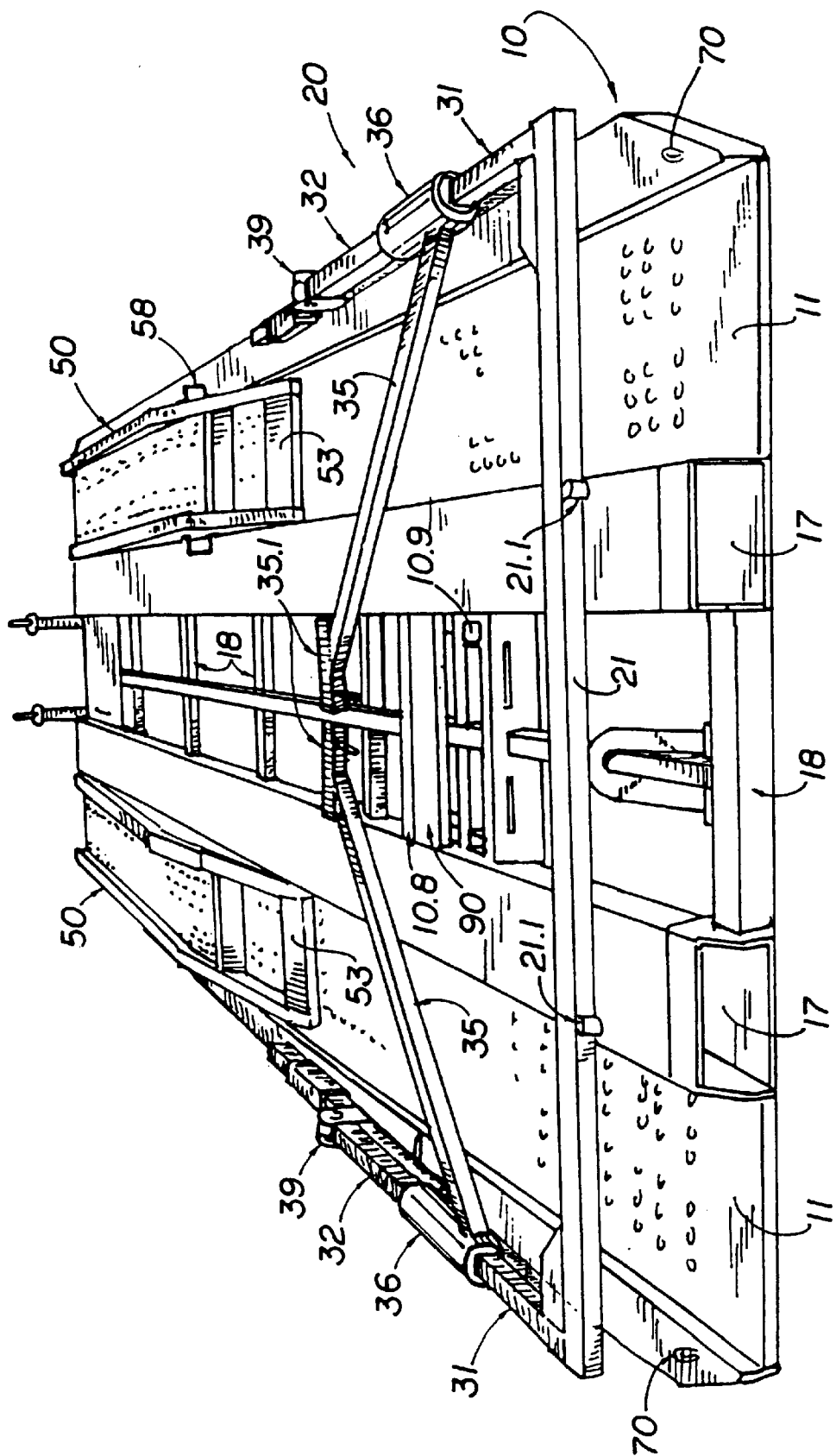
FIG. 3 is a front perspective view of the frame device of FIG. 1 in its collapsed or non-use configuration.

As shown in FIG. 3, the device 1 may be disassembled and placed into a non-use configuration which is suitable for storage or shipment of the device 1. In the non-use configuration, the ramps 50 are detached from the cross-bar 21, and laid substantially flat upon the base member 10. Because the rear support members 40 are connected at their top end 41 to the ramps 50 and at their bottom end 42 to the base member 10 by pivoting joints 43, 44, respectively (as shown in FIG. 5), the rear support members 40 may pivot into a substantially flat position on the base member 10. As shown in FIG. 3, the rear support members 40 may be substantially covered by the ramps 50 when the device 1 is in the non-use configuration.

The front support assembly 20 may lay substantially flat relative to the base member 10 in the non-use configuration. In order to arrange the front support assembly 20 into a flat position, the front support assembly 20 may include several adjustable components. For example, as shown in FIGS. 1, 3, 4, 5, and 6, the front support assembly 20 includes leg assemblies 30 which support the cross-bar 21. As shown in FIG. 4, the leg assemblies 30 include upper legs 31 which, on one end, are attached to the cross member 21, and at the other end are telescopically received in the lower legs 32. The upper legs 31 may be positioned at different heights within the lower legs 32 as provided by the telescoping connection. The lower legs 32 contain a bore 33 through which a pin 34 may be received. The upper legs 31 may, for example, have a plurality of holes that may be aligned with the bore 33 of the lower legs 32. The height of the upper legs 31 may be adjusted by aligning a selected hole from the plurality of holes in the upper leg with the bore 33. The pin 34 may then be inserted through both the bore 33 in the lower legs 32 and the aligned hole of the upper legs 31. The height of the upper legs 31 may be changed by aligning a different hole with the bore 33 in the lower legs 32. In a preferred embodiment, the pin 34 is spring loaded with a biasing force that tends to insert the pin 34 into the bore 33. In this manner, height adjustments are simplified in that the pin 34 automatically inserts into the bore 33 via the biasing force when the hole in the upper leg 31 is moved into alignment with the bore 33.

In addition to the upper legs 31 and lower legs 32, the leg assemblies 30 include angle braces 35. The angle braces 35 are rotatably attached to the lower legs 32 near the top end 32.1 of the lower legs 32. One end of each angle brace 35 is connected to the lower legs 32 by a collar 36. The collar 36 rotates about the lower leg 32, as indicated by arrow 36.1 in FIG. 4, but is fixed with respect to the height along the lower leg 32. The other end of each angle brace 35 is adapted to removably connect to the bottom bar 37 of the leg assembly 30. The angle brace 35 may have a fitting 35.1, for example, welded to the angle bar 35. The fitting 35.1 may be shaped to engage the bottom bar 37 and may, for example, attach to the bottom bar 37 by a pin 38 which extends through a hole not shown in the fitting 35.1 and through a hole not shown in the bottom bar 37. The pin 38 may be, for example, spring loaded with a biasing force that tends to insert the pin 38 into holes now shown. By removing pin 38, the fitting 35.1 may be separated from the bottom bar 37 which in turn frees the angle brace 35 to rotate via collar 36 about the lower leg 32.

The lower leg 32 is connected to the bottom bar 37 by a pin joint 39. The pin joint 39 provides for a rotatable connection between the lower leg 32 and the bottom bar 37 wherein the lower leg 32 may rotate about the axis 39.1 of the pin joint 39.

When the angle brace 35 is attached to the bottom bar 37 via fitting 35.1, the leg assembly 30 is in the in-use configuration in which the lower leg 32, bottom bar 37, and angle brace 35 form the three sides of a triangle that has fixed length sides and fixed angles. For example, the angle between the lower leg 32 and the bottom bar 37 may be approximately 90° which is, for example, an advantageous angle for carrying the load on the cross-bar 21 to the base member 10.

When the angle brace 35 is not attached to the bottom bar 37, that is, when the fitting 35.1 is released from the bottom bar 37, the angle brace 35 may rotate via collar 36 about the lower leg 32 as shown in FIG. 4. This permits the angle brace 35 to be rotated into a position wherein the leg assembly 30 may be rotated about the pin joint 39 at the bottom of the lower leg 32, so that the leg assembly 30 may lie substantially flat on the base member 10 as shown in FIG. 3.

The bottom bars 37 are attached to the base member 10 along the outside edges 12 of the base member 10. According to one embodiment of the present invention, the bottom bars 37 are adjustably attached to the base member 10, such that, for example, the bottom bars 37 may be positioned relatively forward or backward on the base member 10 such that the distance from the pin joints 39 of the lower legs 35 are adjustable relative to, for example, the pivoting joints 44 of the rear support members 40.

An exemplary embodiment for the attachment of the bottom bars 37 to the base member 10 is shown in FIGS. 1, 4, and 5. The base member 10 contains guide mounts 13 arranged longitudinally on the edges 12 of the base member 10. The bottom bars 37 are received in the guide mounts 13 and may be fixed into predetermined positions with respect to the guide mounts 13 via pins 14. The pins 14 may be inserted through a bore 13.1 in the guide mount 13 and further into one of a plurality of guide mount positioning holes 37.2 in the bottom bar 37. The pins 14 may be spring mounted such that a spring biasing forces tends to insert the pins 14 into the bore 13.1 of the guide mount 13. Thus, when a hole 37.2 lines up with the bore 13.1, the pin 14 will automatically insert therethrough.

By adjusting the position of the bottom bar 37 via pins 14, the relative longitudinal position of the leg assemblies 30 relative to the base member 10 may be adjusted. Also, the relative height of the upper legs 31 may be adjusted via pins 34. Thus, the two adjustments may be made in conjunction with one another to adjust the position of the ramps 50 to attain optimum shipping configurations for various size vehicles.

In an alternative embodiment of the invention, the pin joints 39 of the lower legs 32 and the fittings 35.1 of the angle braces 35 may attach directly to the base member 10 rather than to bottom bars 37. As one of skill in the art will recognize, such an alternative embodiment does not permit adjustment of the relative distance between, for example, the pin joints 39 of the lower legs 32 and the pivoting joints 44 of the rear support members 40.

Figure 6:
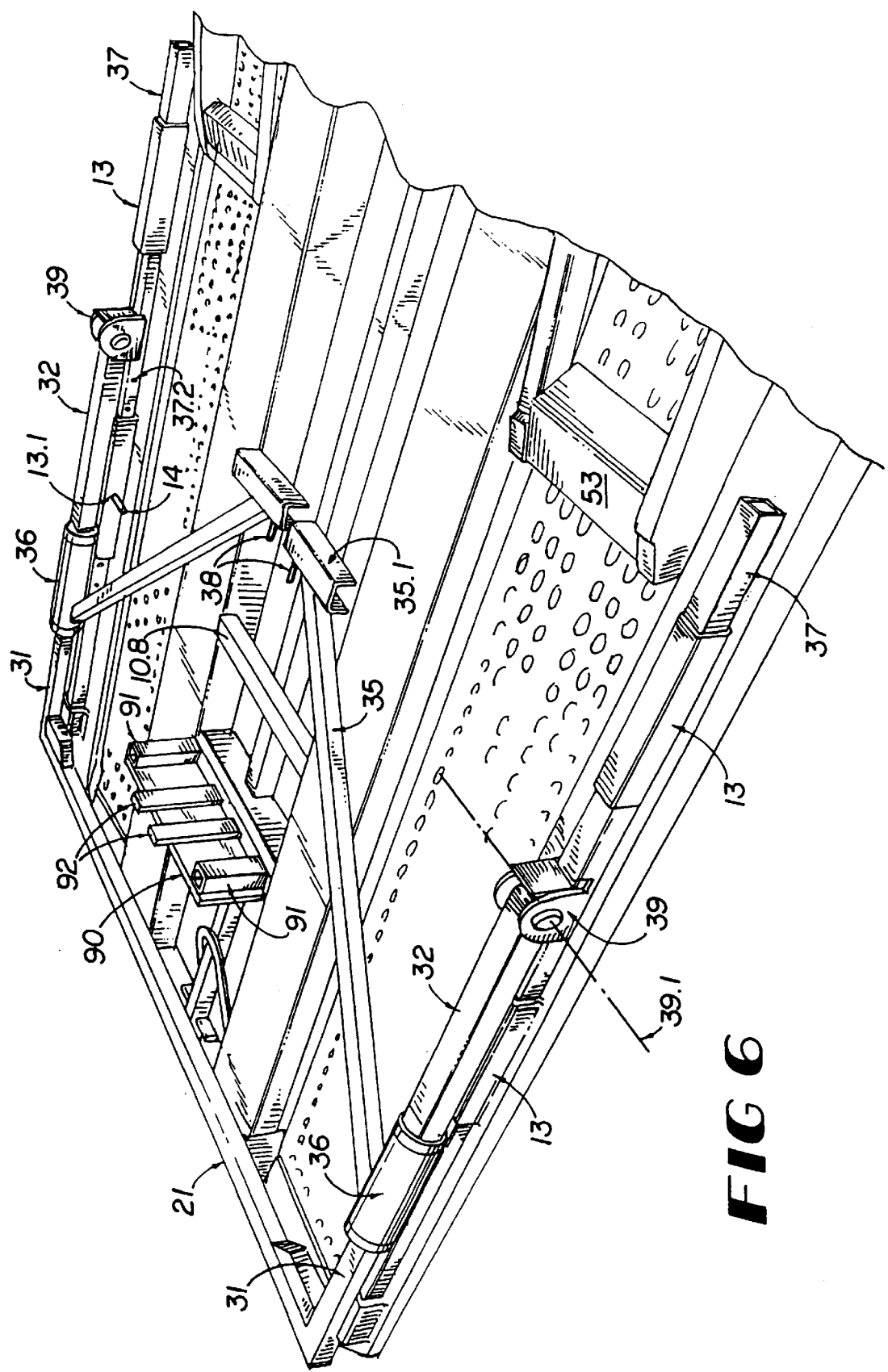
FIG. 6 is a perspective view of the front portion of the device according to the present invention.
Figure 7:
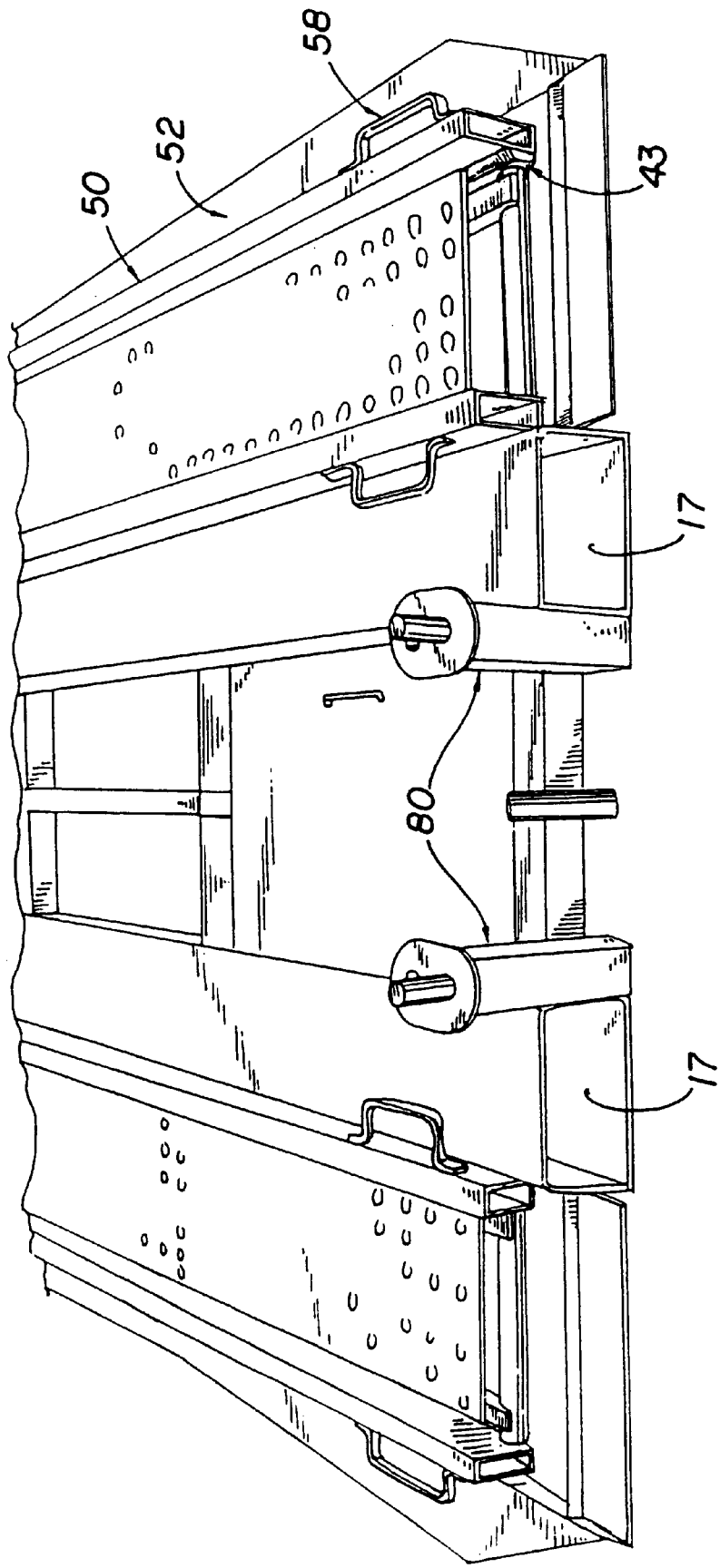
FIG. 7 is a perspective view of the rear portion of the device according to the present invention.

In the non-use configuration, the device 1 is adapted to stack onto similarly configured devices, for example, for storage or return shipment in a non-use state. The device 1 includes stacking elements 80, as shown in FIG. 7, which are received by a second device stacked on top of the first device 1. Additionally, the device 1 includes a stacking plate 90, as shown in FIG. 6, which is movable between a non-use or stacking position and an in-use or non-stacking position. In the stacking position, the studs 91 of the stacking plate 90 are inserted into receptacles 10.9 of the base member 10 such that the stacking plate 90 protrudes vertically from the base member 10. The stacking plate 90 is thus adapted to support a second device stacked on top of the first device 1.

In the in-use or non-stacking position, the stacking plate 90 lies in a substantially horizontal orientation with members 92 inserted under a retaining bar 10.8 of the base member 10. The stacking plate 90 may be chained to the base member 10 to prevent loss or misplacement thereof.

The base member 10 may optionally be provided with a number of wheels 10.1 whereupon the base member 10 in use rides.

In use, two fully built-up vehicles 2 and 3 may be loaded onto the device 1 outside of the container 4, as shown in FIG. 2. The first vehicle 2 may be driven onto the ramps 50 by providing a pair of auxiliary ramps 59 to extend from the ends of the ramps 50 to the ground level. After driving the vehicle 2 onto the ramps 50 the auxiliary ramps 59 may be removed. The second vehicle 3 may also be driven onto the tracks 11. The vehicles 2 and 3 may be loaded onto the device in any order, for example, vehicle 2 may be loaded before vehicle 3 or vice versa.

The device 1 may be provided on a trolley 60 (or alternatively a pallet) which is then pushed against a transport container as shown in FIG. 2. The device 1 with vehicles 2 and 3 are then pushed wherein the device 1 may slide on its wheels 10.1 into the container 4, shown as partially inserted in FIG. 2.

Alternatively the device 1 with vehicles 2 and 3 thereon may be provided directly on a support surface and the container floor 4.1 may be provided on the same level as the support surface. The device I may then be slid into the container 4.

The base member 10 also includes engagement formations 17 in the form of tubular members engageable by an apparatus such as a fork-lift to lift the device 1. The device 1 is accessible to a fork lift on both the front and rear ends of the device 1 and may be lifted while loaded with vehicles as well as in the collapsed, nonuse configuration. Structural support members 18 are provided between the engagement formations 17. The formations 17 may also be engaged by the fork lift in order to push, lift, and maneuver the device 1, for example, when placing the loaded device 1 into a shipping container 4.

Eye formations or the like 70 may be provided on the device 1 for securing the vehicles 2 and 3 onto the device 1. For example, straps (not shown) may be used to strap around, for example, the wheels of the vehicles 2 and 3, and may then be secured to the eye formations 70.

An exemplary assembly procedure to transform the embodiment of the invention from its non-use configuration as shown in FIG. 3 to its in-use configuration as shown in FIG. 1 includes, by way of a non-exclusive example, the following steps. The angle brace 35 may be rotated about the axis of the lower leg 32 via collar 36, for example, approximately 90° to 180°. Thus, the cross-bar 21 and leg assemblies 30 (i.e. the upper leg 31, lower leg 32, and angle brace 35) may be pivoted about the pin joints 39 to a substantially upright position, as shown, for example, in FIG. 4.

With the leg assemblies 30 in a substantially upright position, each angle brace 35 may be rotated about the axis of the lower leg 32 so that the fitting 35.1 of the angle brace 35 is aligned with the bottom bar 37. The fitting 35.1 of the angle brace 35 may be secured to the bottom bar 37 by inserting pin 38 through the aligned holes not shown of the fitting 35.1 and bottom bar 37, respectively.

As necessary for the particular vehicles to be transported, the relative height of the cross-bar 21 and relative longitudinal position of the front support assembly 20 relative to the base member 10 may be adjusted. The height of the cross-bar 21 may be adjusted by altering the position of the upper legs 31 relative to the lower legs 32 through alignment of holes in the upper leg 31 with the bore 33 in the lower leg 32. Pin 34 may be inserted through the aligned holes to secure the upper legs 31 and hence the cross-bar 21 at the desired height.

The position of the front support assembly 20 (i.e. the cross-bar 21, upper legs 31, lower legs 32, angle braces 35, and lower bars 37) relative to the base member 10 may be adjusted as desired. The front support assembly 20 may be moved forward or backward on the base member 10 to align one of the plurality of guide mount positioning holes 37.2 in the lower bars 37 with the bore 13.1 in a guide mount 13 of the base member 10.

With the front support assembly 20 appropriately positioned and secured on the base member 10, the ramps 50 may be erected. Using, for example, handles 58, the front end 51 of a ramp 50 may be lifted and placed upon the cross-bar 21, in particular, the channel members 53 of the ramps may be placed over the cross-bar 21. The back end 52 of ramp 50, via pivoting joints 43 and 44 of the rear support 40, will naturally follow the lifting of the front end 51 in order to allow the channel member 53 to be placed over the cross-bar 21. As shown in FIG. 5, the back end 52 of ramp 50 may be lifted before the front end 51 of ramp 50, such that the rear support 40 is substantially vertical relative to the base member 10 while the front end 51 of the ramp 50 remains in contact with the base member 10. The front end 51 of the ramp 50 may then be lifted onto the cross-bar 21.

Auxiliary ramps 59 may be placed onto the back end 52 of ramps 50 in order to provide easy loading of a vehicle onto ramps 50 of device 1. A second vehicle may be driven onto tracks 11 of the base member 10. The vehicles may be loaded onto the device 1 in either order.

Unloading and disassembly of the device 1 may be accomplished by reversing the steps of the procedure described above The invention thus provides a sturdy, collapsible device which is integral so that vehicles can be reliably and efficiently transported. The units are easily assembled and disassembled and can be readily stacked for efficient storage and transport when not in use.

It will be appreciated that variations in detail are possible without thereby departing from the scope and spirit of the invention.

What is claimed is:

1. A collapsible frame device suitable for packing at least a first vehicle and a second vehicle in a transport container having at least a floor and a wall structure, the frame device comprising:

a base constructed to rest on a container floor, the base for supporting the first vehicle, the base having a front portion and a rear portion;

a front support member pivotally attached to the front portion of the base, the front support member having an in-use position wherein the front support member extends substantially upward from the base, and having a non-use position wherein the front support member pivots from the in-use position to a substantially flat position relative to the base;

said front support member further including a cross-bar which extends transversely across the base from a first side to a second side of the base, and first and second upright members which in the in-use position of the device extend substantially upright from the base on opposite sides of the cross-bar to engage the cross-bar and support the cross-bar in an elevated position from the base;

said front support member further including first and second angle braces rotatably attached to the first and second upright members, the first and second angle braces being releasably attachable to the base, wherein, in an in-use positions the first and second angle braces are attached to the base and to the first and second upright members respectively, and in the non-use position, the first and second angle braces are attached only to the first and second upright members respectively, the first and second angle braces rotating about the first and second upright members respectively into a storage position;

a rear support member pivotally attached to the rear portion of the base, the rear support member having an in-use position wherein the rear support member extends substantially upward from the base and having a non-use position wherein the rear support member pivots from the in-use position to a substantially flat position relative to the base; and a ramp having first and second ends, the first end pivotally attached to the rear support member, and the second end adapted to releasably attach to the front support member, the ramp having an in-use position wherein the second end of the ramp is attached to the front support member, and having a non-use position wherein the second end of the ramp is not attached to the front support member, wherein a second vehicle may be supported on the ramp in the in-use position.

2. The device of claim 1 wherein the base comprises a frame defining two opposing long sides and two opposing short ends.

3. The device of claim 1 wherein the front support member pivots about a front support axis to collapse the front support member onto the base, the front support axis extending substantially perpendicular to a line from the front portion to the rear portion of the base.

4. The device of claim 1 wherein the cross-bar is secured to the upright members.

5. The device of claim 1 wherein the front support member further includes first and second bottom bars slidably attached to the base, wherein the first and second upright members are rotatably attached to the first and second bottom bars, respectively, and the first and second angle braces are releasably attachable to the first and second bottom bars, respectively, and wherein, the first and second bottom bars may be moved longitudinally relative to the base to adjust a position of the front support member relative to the base.

6. The device of claim 1 wherein the first and second upright members further comprise first and second upper legs adjustably attached to first and second lower legs, respectively, wherein the elevated position of the cross-bar may adjusted by altering the attachment of the first and second upper legs to the first and second lower legs, respectively.

7. The device of claim 1 wherein the rear support member pivots about an axis substantially perpendicular to a line from the front portion to the rear portion of the base to collapse the rear support member onto the base.

8. The device of claim 1 wherein the front support member is movably attached to the base.

9. The device of claim 1 wherein the ramp comprises first and second ramp members, the first and second ramp members each comprising an elongate member which in the in-use configuration of the device is releasably attachable to the front support member.

10. The device of claim 9 wherein the first and second ramp members are adapted to allow a vehicle to be driven thereon in the in-use position of the ramp members.

11. The device of claim 1 wherein the base carries a first vehicle support member for supporting said first vehicle thereon in a space provided at least partly below the ramp.

12. The device of claim 11 wherein the first vehicle support member comprises a pair of tracks secured or securable to the base.

13. The device of claim 12 wherein the first vehicle support member in use support the first vehicle in position substantially parallel to the base.

* * * * *